(12) United States Patent
Billiet (10) Patent No.: US 10,406,467 B2
(45) Date of Patent: Sep. 10, 2019

(54) APPARATUS FOR CONTAMINANT REDUCTION IN A STREAM OF COMPRESSED GAS

(71) Applicant: Norgren Limited, Staffordshire (GB)

(72) Inventor: Colin Billiet, Gateshead (GB)

(73) Assignee: Norgren Limited, Staffordshire (GB)

( * ) Notice: Subject to any disclaimer, the term of this patent is extended or adjusted under 35 U.S.C. 154(b) by 391 days.

(21) Appl. No.: 15/129,041

(22) PCT Filed: Mar. 31, 2015

(86) PCT No.: PCT/GB2015/050975
§ 371 (c)(1),
(2) Date: Sep. 26, 2016

(87) PCT Pub. No.: WO2015/150772
PCT Pub. Date: Oct. 8, 2015

(65) Prior Publication Data
US 2018/0169553 A1    Jun. 21, 2018

(30) Foreign Application Priority Data
Mar. 31, 2014    (GB) .................................. 1405759.0

(51) Int. Cl.
*B01D 45/00*    (2006.01)
*B01D 45/08*    (2006.01)
(Continued)

(52) U.S. Cl.
CPC ............. *B01D 45/08* (2013.01); *B01D 45/12* (2013.01); *B01D 45/16* (2013.01); *B04C 5/06* (2013.01);
(Continued)

(58) Field of Classification Search
CPC ........ B01D 45/08; B01D 45/12; B01D 45/16; B01D 50/002; B01D 46/0031; B01D 46/24; B04C 5/103; B04C 5/06
See application file for complete search history.

(56) References Cited

U.S. PATENT DOCUMENTS 1,809,375 A * 6/1931 Chase ................... F02M 29/06
138/37
1,854,010 A * 4/1932 Woodford .............. B01D 46/24
222/189.06
(Continued)

FOREIGN PATENT DOCUMENTS

DE    102010005981 A1    8/2011
EP         2556873 A1    2/2013

*Primary Examiner* — Dung H Bui
(74) *Attorney, Agent, or Firm* — The Ollila Law Group LLC (57) ABSTRACT

An apparatus for contaminant reduction in a stream of compressed gas is disclosed. The apparatus includes an insert for directing the gas. The insert sits in a head portion which has an inlet leading to an inlet pathway for directing the gas towards the insert. The head portion also has an outlet leading from an outlet pathway for directing the gas from the insert towards the outlet. There is also a body portion sealed to the head portion for collecting contaminants removed from the gas. The insert includes a tubular portion connected to the head portion. Gas from the inlet pathway passes outside the tubular portion while gas going to the outlet passes inside the tubular portion. The insert has a baffle extending from the tubular portion for narrowing the gap between the insert and the body portion and has curved walls extending from the baffle causing the stream of gas to rotate thereby form a vortex.

6 Claims, 7 Drawing Sheets

US 10,406,467 B2
Page 2

(51) Int. Cl.
    *B01D 45/16*     (2006.01)
    *B01D 45/12*     (2006.01)
    *B04C 5/06*     (2006.01)
    *B04C 5/103*     (2006.01)
    *B01D 50/00*     (2006.01)
    *B01D 46/00*     (2006.01)
    *B01D 46/24*     (2006.01)

(52) U.S. Cl.
    CPC .......... *B04C 5/103* (2013.01); *B01D 46/0031* (2013.01); *B01D 46/24* (2013.01); *B01D 50/002* (2013.01)

(56) References Cited

U.S. PATENT DOCUMENTS

| | | | | |
|---|---|---|---|---|
| 2,068,048 A * | 1/1937 | Renard | ................ | B01D 50/002 210/304 |
| 2,402,845 A * | 6/1946 | Rodman | ................... | B04C 7/00 55/345 |
| 2,711,226 A * | 6/1955 | Albert, Jr. | ................. | B03C 3/15 96/61 |
| 2,720,278 A * | 10/1955 | Wiley | ................ | B01D 46/0031 210/306 |
| 2,894,600 A * | 7/1959 | Veres | ................ | B01D 46/0031 55/335 |
| 2,936,043 A * | 5/1960 | Armstrong | ................ | B04C 5/06 55/416 |
| 3,078,650 A * | 2/1963 | Anderson | .......... | B01D 46/2411 55/337 |
| 3,269,097 A * | 8/1966 | German | ................ | B01D 45/06 55/337 |
| 3,378,993 A * | 4/1968 | Veres | ..................... | B01D 45/08 137/194 |
| 3,386,588 A * | 6/1968 | Ades | ........................ | B04C 5/28 209/728 |
| 3,443,368 A * | 5/1969 | Wilson | .................... | B04C 5/085 55/435 |
| 3,448,563 A * | 6/1969 | Sobeck | ..................... | B04C 3/04 210/512.2 |
| 3,504,804 A * | 4/1970 | Arnold | .................... | B04C 5/103 209/17 |
| 3,507,098 A * | 4/1970 | Veres | ........................ | F16T 1/14 137/194 |
| 3,845,840 A * | 11/1974 | Thrasher | .................... | F01N 1/10 181/211 |
| 4,162,905 A * | 7/1979 | Schuler | .................. | B01D 45/16 55/337 |
| 4,217,118 A * | 8/1980 | Kopf | .................. | B01D 46/2411 55/330 |
| 4,233,160 A * | 11/1980 | Macierewicz | ............ | B04C 5/06 209/728 |
| 4,311,494 A * | 1/1982 | Conner | ................... | B01D 45/16 55/394 |
| 4,409,005 A * | 10/1983 | McKendrick | ...... | B01D 46/0031 137/203 |
| 4,420,314 A * | 12/1983 | Barron, Jr. | ................ | B04C 5/06 55/436 |
| 4,537,608 A * | 8/1985 | Koslow | ................ | B01D 50/002 55/337 |
| 4,668,256 A * | 5/1987 | Billiet | .................... | B01D 45/08 55/337 |
| 4,966,703 A * | 10/1990 | Kalnins | .............. | B01D 17/0217 210/512.1 |
| 5,271,245 A * | 12/1993 | Westermeyer | ........ | B01D 50/002 62/470 |
| 5,494,501 A * | 2/1996 | Anspach | ................ | B01D 45/14 55/330 |
| 5,575,615 A * | 11/1996 | Mohn | ........................ | F04D 1/00 210/322 |
| 5,746,791 A * | 5/1998 | Wang | ................... | B01D 53/265 55/337 |
| 6,932,849 B2 * | 8/2005 | Sheidler | ................ | B01D 45/16 55/347 |
| 7,001,448 B1 * | 2/2006 | West | ...................... | B01D 45/16 55/413 |
| 7,442,220 B2 * | 10/2008 | Pearson | ............ | B01D 46/0012 210/444 |
| 7,537,624 B2 * | 5/2009 | Jachmann | .............. | B01D 45/16 55/337 |
| 8,075,656 B2 * | 12/2011 | Lane | ...................... | B01D 45/06 210/512.1 |
| 9,151,449 B2 * | 10/2015 | Sakai | ..................... | F17C 13/002 |
| 9,272,235 B2 * | 3/2016 | Yamase | ............ | B01D 46/0005 |
| 9,314,726 B2 * | 4/2016 | Yamase | ............ | B01D 36/006 |
| 9,649,576 B2 * | 5/2017 | Bozic | ................ | B01D 19/0057 |
| 2007/0137156 A1 * | 6/2007 | da Costa | ........... | B01D 46/0024 55/486 |
| 2010/0275561 A1 * | 11/2010 | Lundquist | ................ | B04C 3/00 55/456 |
| 2011/0113738 A1 * | 5/2011 | Zachos | ................ | B01D 45/08 55/320 |
| 2013/0327002 A1 * | 12/2013 | Ackermann | ......... | B01D 50/002 55/327 |
| 2014/0083064 A1 * | 3/2014 | Sakai | .................... | B01D 45/16 55/449 |
| 2018/0036746 A1 * | 2/2018 | Antomon | ............... | B01D 45/16 |

\* cited by examiner

APPARATUS FOR CONTAMINANT REDUCTION IN A STREAM OF COMPRESSED GAS

The present invention relates to an apparatus for contaminant reduction in a stream of compressed gas and relates particularly, but not exclusively, to an insert for use in an apparatus for contaminant reduction in a stream of compressed air.

Compressed air is widely used throughout industry as a safe and reliable source of energy. However, the quality of the compressed air delivered directly from the compressor is unsuitable for most uses without treatment to improve its purity. Treating compressed air generally involves filtering it, to remove oil and particulate, and drying it to remove moisture. These processes result in a loss of compressed air pressure. This is generally compensated for by the compressor generating compressed air at a higher pressure than is actually required by the production process, which is energy inefficient.

Compressed air contains contaminants such as condensed water, water vapour, oil and particulates which need to be removed before use. Quality standard ISO8573.1 specifies air quality standards for these contaminants. Of the contaminants present water condensate accounts for the highest quantity.

Atmospheric air at, for example, 25° C. and 60% relative humidity contains 13.8 g/m$^3$ of water vapour. Following compression to typically 7 bar g, air is discharged from the compressor via an air-cooled after-cooler. The discharge temperature will typically be 30° C. with 100% relative humidity and the air will therefore contain 3.8 g/m$^3$ of water vapour. When the air cools further in the distribution system to 25° C. it will contain 2.9 g/m3 of water vapour. So, at the after-cooler 10 g/m3 of water vapour is condensed and in the distribution system a further 0.9 g/m3 of water vapour is condensed. For a typical 18 KW (25 hp) compressor discharging at a rate of 170 m$^3$/hour of compressed air, over 4,000 hours annually; the total water condensed is 6,800 liters at the after-cooler and 612 liters within the distribution system.

The efficient removal of this condensate that remains after the after-cooler is essential to the performance of other purification equipment such as high efficiency oil removal filtration and dryers including refrigerated, desiccant and membrane dryers.

An example of a condensate and particulate removal system of the prior art is the use of a sintered material as a filter. However, sintered filters are known to have high pressure loss due to their low internal voids volume, typically just 20%. Furthermore, the filtering nature of the sintered material results in the internal voids becoming blocked with small particles and oils thereby further reducing the efficiency of the apparatus. Furthermore, the filtration component is expensive and requires regular replacement as the voids in the sintered material become blocked with the particulate material that has been removed from the compressed air. It is also the case that the process of replacement of this component is time-consuming further adding to the cost of maintenance of the filter.

In another example of the prior art there are radially arranged baffles to impart a spinning motion by directing the air past their angled blades. However, the flow of air is not even across all of the blades and therefore there are discrepancies in the speed at which the stream of compressed air is spun, which leads to ineffective condensate removal. This is followed by various conical shaped baffles and a replaceable filter stage typically formed from polymer or metallic sintered tubular material. Such designs focus on the particle removal rating rather than the removal of the water condensate such that the water condensate removal efficiency is not optimised. High pressure losses are also present particularly due the filtration stage.

Preferred embodiments of the present invention seek to overcome the above described disadvantages of the prior art. For example, it is desirable to remove the condensate from the compressed air system efficiently with minimum energy consumed, for example through pressure loss. It is also desirable to remove serviceable items such as sintered filter elements.

According to an aspect of the present invention there is provided an apparatus for contaminant reduction in a stream of compressed gas, the apparatus comprising:—
  a first insert for directing a stream of compressed gas;
  a head portion including an inlet for receiving a stream of compressed gas, an outlet for said gas, an inlet pathway for directing said gas from said inlet towards said first insert and an outlet pathway for directing said gas from said first insert towards said outlet;
  a body portion for collecting contaminants removed from said gas and connected to and sealed relative to said head portion, said body portion including a drain port for exhausting said contaminants after removal from said stream of compressed gas,
  wherein said first insert is located within a volume formed by said head and body portions and comprises
  a tubular portion connected to said head portion such that said gas from said inlet pathway engages said first insert externally of said tubular portion and said gas passes to said outlet pathway from internally of said tubular portion,
  at least one baffle extending from said tubular portion and thereby narrowing a substantially annular gap between said first insert and a wall of at least one of said body and head portions, and
  at least one curved wall extending from said baffle for causing said stream of compressed gas to rotate around an axis of said tubular portion and thereby form a vortex.

By providing an insert with a gap reducing baffle and spin imparting walls the advantage is provided that the insert is able to effectively remove water condensate and particles in a simple single step with minimal loss of compressed air pressure. The condensate water is sufficient to wash the vast majority of particles out of the stream of compressed gas by the mixing effect of the formation of the vortex together with the impact against the wall of the head and/or body portion. Furthermore, this apparatus has significantly reduced maintenance compared to filter apparatus using sintered materials because the insert is not acting as a filter and therefore does not become blocked as a result, the insert simply needs very occasional removal and cleaning from the apparatus in the event that a large particles have got caught between the walls that extend from the baffle.

The first insert may comprise a plurality of curved walls, said walls extending radially outwards beyond said baffle and forming retaining portions at distal ends of said walls for engaging at least one of said body and head portions.

By providing a plurality of curved walls that form retaining portions at their distal ends, the advantage is provided that the first insert can be located and retained adjacent the junction between the head portion and the body portion. As a result, the first insert is easily added to the remainder of the apparatus since it is commonplace for the head and body portions to be fitted together by a screw fitting. This also provides the further advantage that the first insert can be easily serviced by these simple steps of unscrewing the head and body portions removing the insert cleaning and reinserting. Furthermore, the insert is able to hold itself stably within the apparatus without the need for additional components such as tie rods.

The first insert may comprise at least one injection moulded thermoplastic material.

The first insert described above can be easily formed by injection moulding thermoplastic material. In particular, the formation of baffle with curved walls extending therefrom, the walls preferably extending parallel to the axis of the tubular portion, allows the insert to be formed in a simple two-part tool. As a result, the first insert is a low-cost item significantly reducing the cost of production of the contaminant reduction apparatus compared to similarly effective apparatus of the prior art.

In a preferred embodiment the head portion comprises a housing and a second insert thereby forming said inlet and outlet pathways.

By having the insert forming the inlet and outlet pathways, it is easy to form those pathways so that the flow of air that engages the walls of the first insert is evenly distributed across each of the walls leading to an even distribution of air speeds leaving the first insert and engaging the inner surface of the wall of the body portion. As a result, there are no slow spots which can result in contaminants not been removed from the air stream due to low air speeds.

In another preferred embodiment the housing comprises an extruded metallic material.

In a further preferred embodiment the second insert comprises an injection moulded thermoplastic material.

By forming the head portion from a housing and a second insert, and in particular using an extruded metallic material to form a housing and an injection moulded thermoplastic material to form the second insert, the advantage is provided that the cost of the head portion of the apparatus of the present invention is significantly lower than similarly effective apparatus of the prior art. This arrangement is possible because the pressure differential between the inside and the outside of the housing is significant whereas the pressure differential between the inlet pathway and the outlet pathway of the second insert is negligible.

The apparatus may further comprise a filter element located at least partially within said first insert.

According to another aspect of the present invention there is provided an insert for use in an apparatus for contaminant reduction in a stream of compressed gas, the apparatus including a head portion having an inlet for receiving a stream of compressed gas, an outlet for the gas, an inlet pathway for directing the gas from the inlet towards the insert and an outlet pathway for directing the gas from the insert towards the outlet, the apparatus also including a body portion for collecting contaminants removed from the gas and connected to and sealed relative to the head portion, the body portion including a drain port for exhausting the contaminants after removal from the stream of compressed gas, the insert comprising:— a tubular portion connected to the head portion such that the gas from the inlet pathway engages said insert externally of said tubular portion and the gas passes to the outlet pathway from internally of said tubular portion, at least one baffle extending from said tubular portion and thereby narrowing a substantially annular gap between said insert and a wall of at least one of said body and head portions, and at least one curved wall extending from said baffle for causing said stream of compressed gas to rotate around an axis of said tubular portion and thereby form a vortex.

The first insert may comprise a plurality of curved walls, said walls extending radially outwards beyond said baffle and forming retaining portions at distal ends of said walls for engaging at least one of said body and head portions.

The first insert may comprise at least one injection moulded thermoplastic material.

Preferred embodiments of the present invention will now be described, by way of example only, and not and in any limitative sense with reference to the accompanying drawings in which:—

Figure 1:
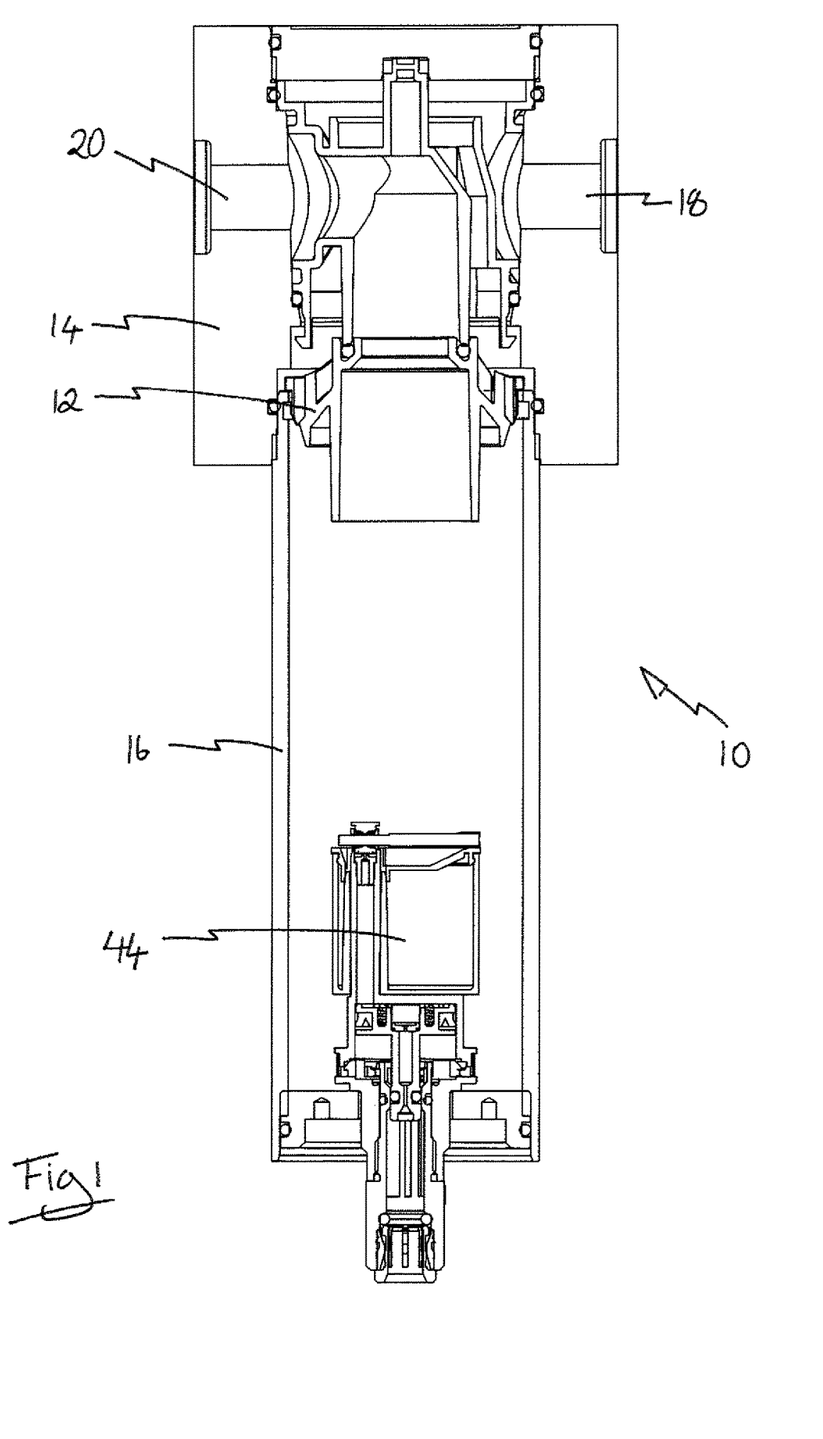
FIG. 1 is a sectional view of an apparatus of the present invention.
Figure 2:
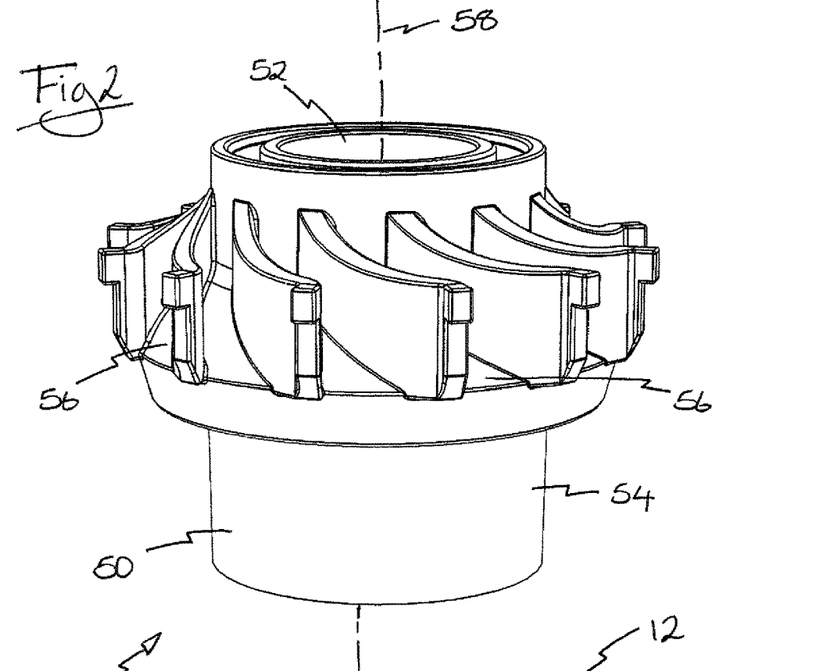
FIG. 2 is a perspective view of a first insert used in the apparatus of FIG. 1.
Figure 3:
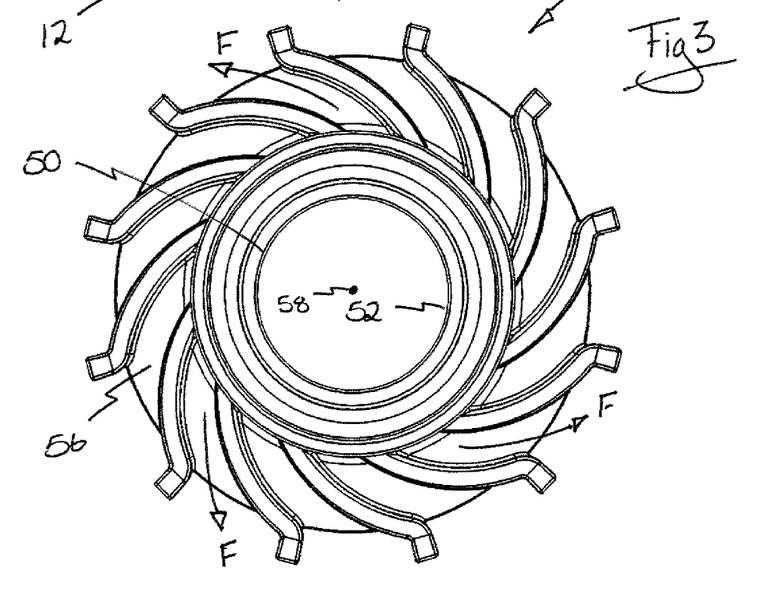
FIG. 3 is a plan view of the insert of FIG. 2.
Figure 4:
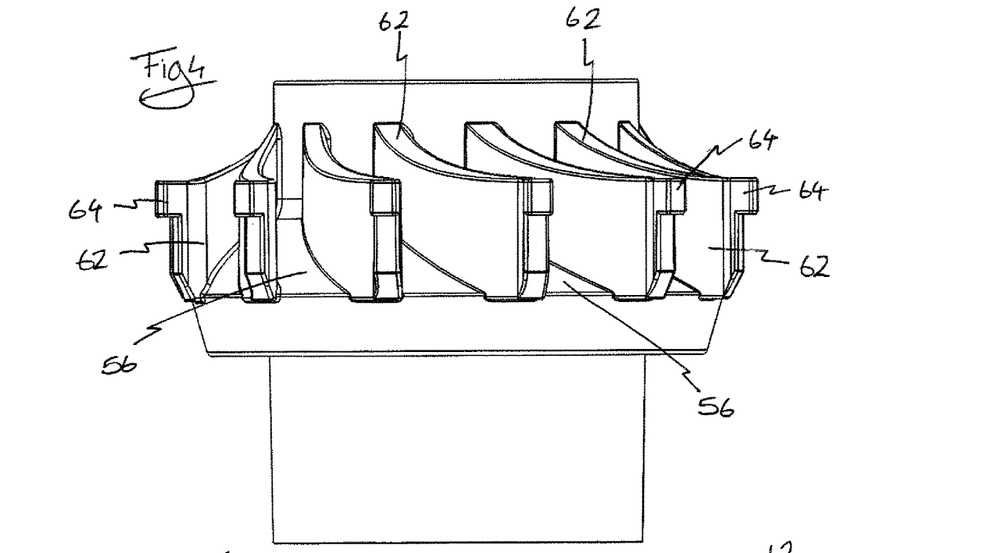
FIG. 4 is a side view of the insert of FIG. 2.
Figure 5:
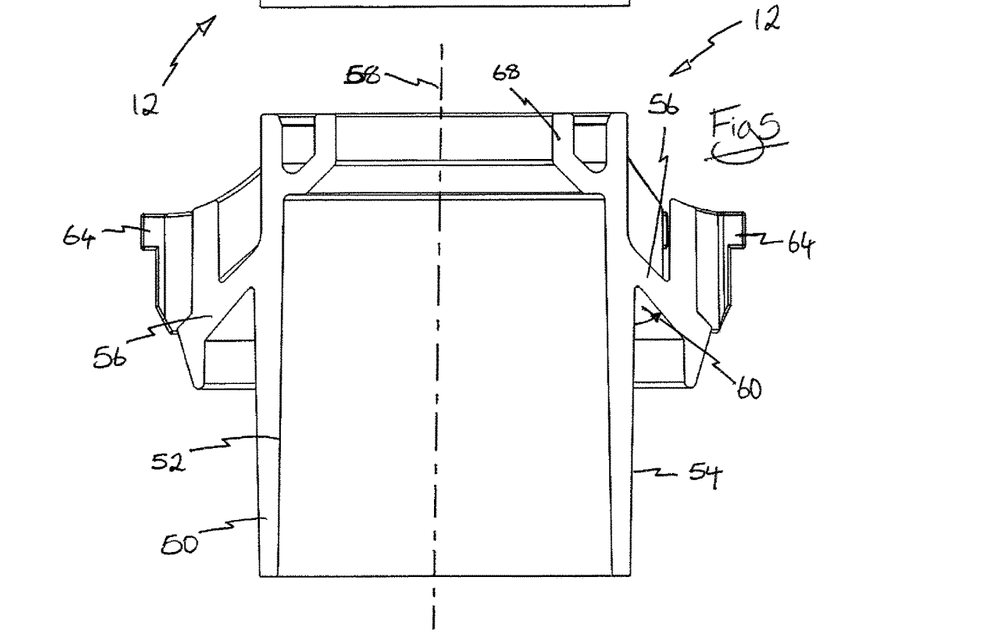
FIG. 5 is a sectional side view of the insert of FIG. 2.

Referring to FIG. 1, an apparatus 10 for contaminant reduction in a stream of compressed gas, in particular compressed air, has a first insert 12 that is used to direct the stream of compressed air. The outermost parts of the apparatus 10 include a head portion 14 and a body portion 16, which together form a sealed volume. The head portion includes an inlet 18 and an outlet 20. The inlet 18 is connected to a compressed airline (not shown) and leads to an inlet pathway 22. The outlet is connected to downstream apparatus (not shown) and extends from an outlet pathway 24. The head portion 14 is formed from two main components, namely a housing 26 and a second insert 28 that are fitted together and sealed relative to one another via O-rings 30, 31 and 32. The seal 31 is provided to prevent any air bypassing the system by running around the space in which seals 30 and 32 sit. The housing 26 is formed from two components, both of which are typically formed from extruded aluminium. The first housing component 34 is substantially tubular and forms the majority of the housing 26. The second housing component 36 is a sealing closure in the form of a disc of extruded aluminium that has an external thread which engages an internal thread formed in the first housing component and the two housing components are sealed relative to each other via O-ring 38.

The body portion 16 is also formed from extruded aluminium and engages the head portion 14 via mutually cooperating threads indicated at 40 and this junction is sealed by O-ring 42. The formation of the inlet 18 and outlet 20, the threads indicated at 40 and other features that cannot be formed during an extrusion process are machined after the extruded components are formed. The body portion 16 is used to collect contaminants removed from the stream of compressed air and includes a drain port 44. The example shown in FIG. 1 is a float valve drain port, although it will be apparent to person skilled in the art that other drainage mechanisms are available and are suitable for exhausting the collected water, oil and dirt from the body portion 16. The tubular body portion 16 has an annular wall 46 which has an inner surface 48 onto which the contaminants are directed and which drains towards the exhaust 44.

Referring additionally to FIGS. 2 to 5, the first insert 12 is located within a volume formed by the head and body portions 14 and 16. The first insert 12 has a tubular portion 50 having inside and outside surfaces 52 and 54. Also forming part of the first insert 12 is a baffle 56 that extends from the tubular portion 50 in a radially outwards direction. The angle at which the baffle 56 extends from the tubular portion is preferably not perpendicular to an axis 58 of tubular portion 50.

The angle, indicated at 60, is acute in the direction of flow of air on the outside of insert 12. Because of the tubular portion 50 and the body portion 16 are both substantially tubular and are aligned coaxially, the gap between the tubular portion and the body portion is annular and substantially the same along the length of the tubular portion. However, the baffle 56 narrows this gap.

Figure 6:
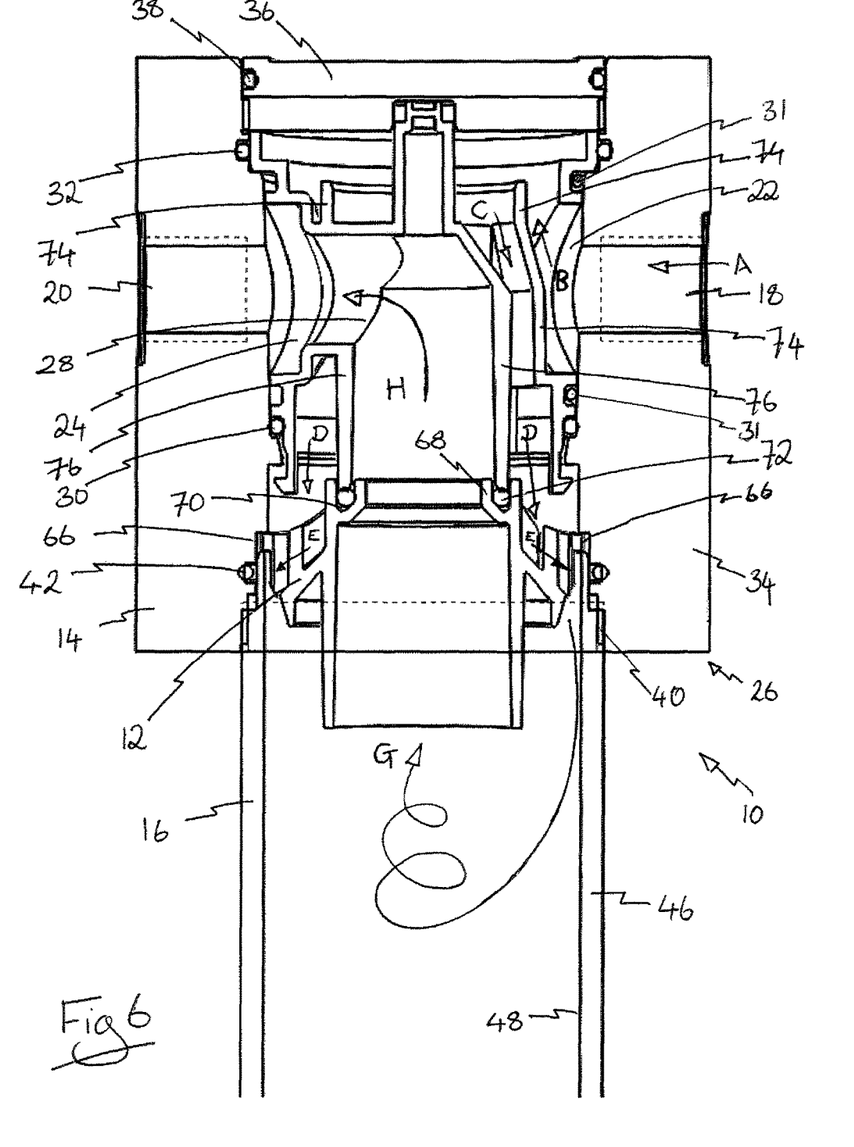
FIG. 6 is a sectional view of a portion of the apparatus of FIG. 1.

The first insert 12 has at least one, and preferably a plurality of, curved walls 62 which extend radially outwards from the tubular portion and upwards, coaxially with axis 58, from baffle 56. The curved walls 62 extend outwards along the upper surface of baffle 56 and beyond thereby entering the gap between the radially outermost edge of baffle 56 and wall 46 of body portion 16. The curved walls 62 terminate in respective retaining portions in the form of lugs 64 which are adapted to sit in a gap (indicated at 66 on FIG. 6) between the uppermost rim edge of body portion 16 and head portion 14. As a result, the first insert 12 is held in place within the apparatus 10 when the head and body portions 14 and 16 are fixed in threaded engagement together. The uppermost end of tubular portion 50 has an annular flange 68 extending a short distance radially inward from the tubular portion which forms an annular recess 70 that receives an O-ring 72 for sealing the first insert 12 relative to the second insert 28. The first and second inserts 12 and 28 are preferably formed by injection moulding using a thermoplastic material. As will be apparent from the figures, the first insert 12 has all of its features aligned so that it can be made from a two-part injection moulding tool with the two parts coming together and separating in a direction parallel to axis 58. For example, the curved walls 62 extend from the baffle 56 parallel to axis 58 allowing them to be formed in a single part of a moulding tool.

The inlet pathway 22 and outlet pathway 24 are formed from a combination of the head portion 14, the first insert 12 and a series of walls that form part of the second insert 28. These walls include an outer wall 74 and a conduit wall 76.

Operation of the apparatus 10 will now be described with reference to all of the drawings. The apparatus is assembled by inserting the second insert 28 through the upper end of first housing component 34, this being the end where the second housing component 36 will sit once assembled. The second housing component 36 is then brought into threaded engagement with the first housing component 34 thereby fixing the second insert 28 into place. The first insert 12 is brought into engagement with the body portion 16 so that the lugs 64 sit on the upper edge of wall 46. The body portion 16 is then brought into threaded engagement with the head portion 14 so that the lugs 64 sit in the space 66 and the O-ring 72 engages the end of conduit wall 76 thereby completing the apparatus. Finally, the inlet 18 and outlet 20 are connected, via suitable pipework, to a compressed air supply and on to downstream components.

When the apparatus is in use, compressed air enters the inlet 18 in the direction indicated at A. After passing through the inlet 18, the stream of compressed air comes into contact with the outside surface of wall 74 of second insert 28. This causes the compressed air to spread around the wall 74 and to move upwards in the direction indicated by B. The compressed air passes over the uppermost edge of the outer wall 74 and changes direction to move in direction C passing into the gap between the wall 74 and the conduit wall 76. After passing by the end of conduit wall 76 and travelling in the direction indicated by D, the stream of compressed air comes into engagement with the outside surface 54 of the tubular portion 50 of the first insert 12. The movement of the air indicated by directions A, B, C and D forms the inlet pathway 22.

Next the compressed air comes into engagement with baffle 56 causing the air to speed up and move in a radially outwards direction, indicated at E. This radially outward movement causes the stream of compressed air to come into contact with the curved walls 62 which diverts the stream of compressed air in the curved path indicated by F (see FIG. 3). This speeding up and spinning of the stream of compressed air causes it to come into engagement with the inner surface 48 of wall 46 of body portion 16. Any non-gaseous contaminants, such as water condensate, oil and particulates, being non-gaseous and having a density greater than the compressed air, will impact the wall 46. Due to the relatively high volume of water condensate in the compressed air at this time the majority of contaminants, other than water namely particulates and oil, tend to be already mixed or tend to become mixed at the point of impact with the water. The condensate water tends to stick to the surface 48 of wall 46 and run down the wall towards exhaust 44. Periodically the exhaust 44 is opened to exhaust the water and contaminants.

Because the air, now separated from the contaminants, has been moved in the curved direction F it continues to rotate following a path schematically indicated by direction arrow G and forms a vortex. The lower part of the tubular portion 50, below the baffle 56, acts as a vortex finder thereby directing the stream of compressed air up the inside of the tubular portion 50. From the inside of the tubular portion 50, the compressed air passes into the conduit formed by the conduit walls 76, thereby forming the outlet pathway 24, travelling in direction H towards the outlet 20.

Figure 7:
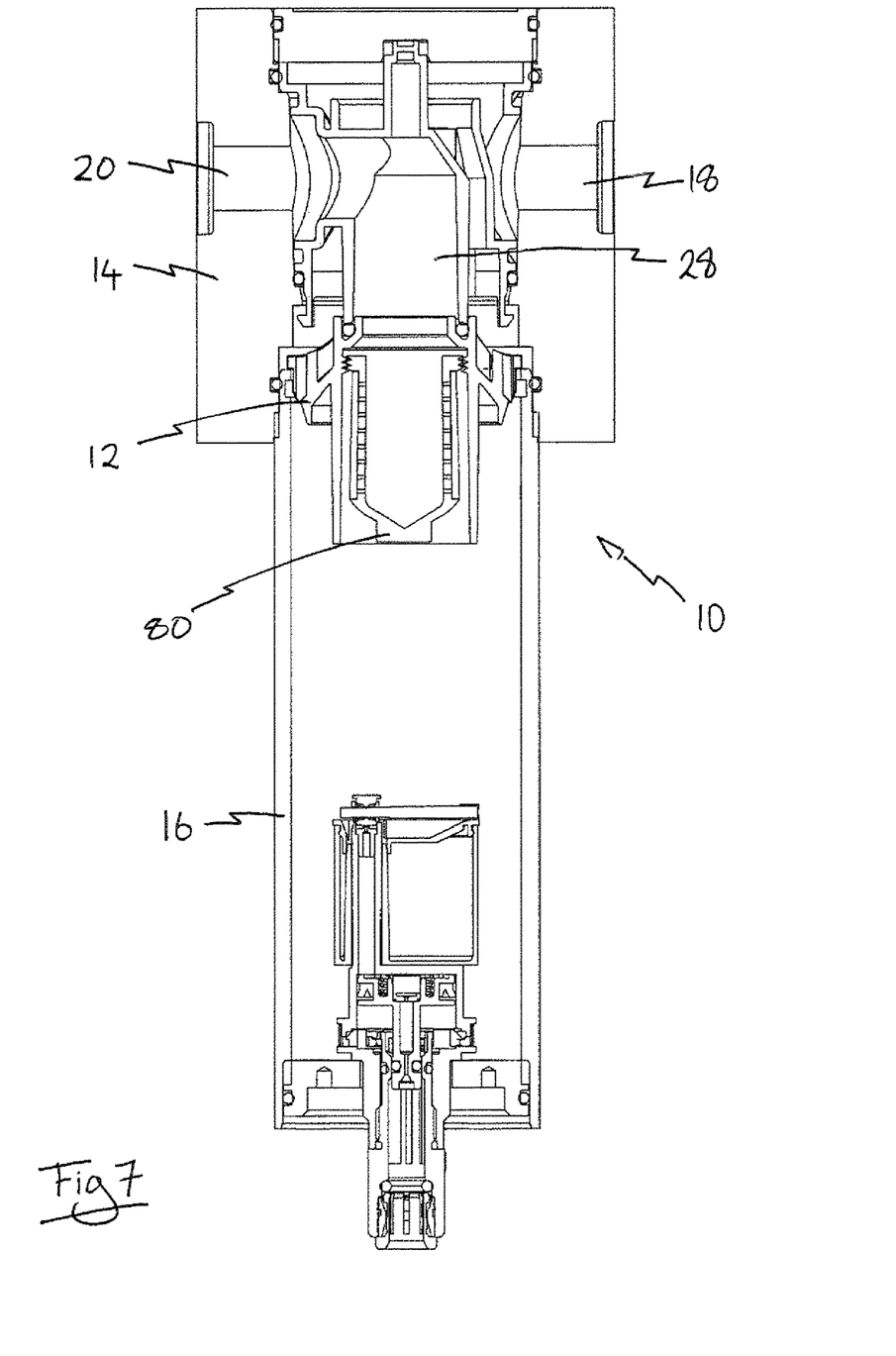
FIG. 7 is a sectional view of an apparatus of another embodiment of the present invention.
Figure 8:
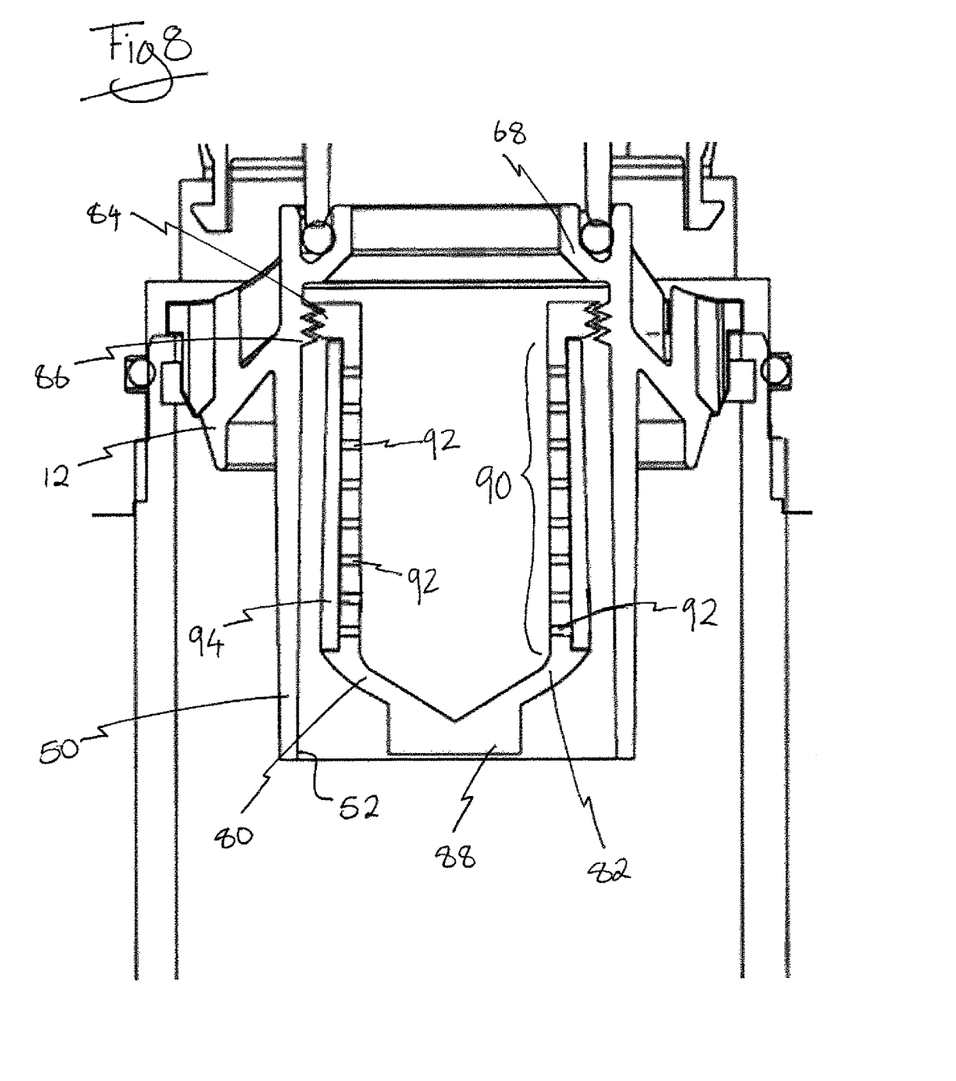
FIG. 8 is a close-up of a portion of FIG. 7.

Referring to FIGS. 7 and 8, which show an alternative embodiment of the present invention; a filter element 80 has been added and is located within the tubular portion 50 of first insert 12. The filter element 80 has a support body 82 that has an external threaded portion 84 that engages an internal thread 86 that is formed into the internal surface 52 of first insert 12 just below the annular flange 68. At the other end of support body 82 an attachment device, in the form of hex head 88, is provided to allow rotational force to be applied to filter element 80 so as to fix it into threaded engagement with the first insert 12. Alternatively, a simple gripping portion could be provided to allow the filter element 80 to be hand tightened. The support body 82 has a tubular portion 90 containing perforations 92. These perforations allow the stream of compressed air to pass from the outside to the inside of filter element 80. Attached to the outside of tubular portion 90 is a sleeve of filter media 94. The filter media could for example be a spun bonded polymer with a micron rating of 5 to 100μ. Such material has an open structure, with voids of greater than 80%, and provides a second stage filtration typically to a particle size of 5 to 10μ.

In operation, the device shown in FIGS. 7 and 8 operates in the same manner as that previously described except that the air passing into the tubular portion 50 of first insert 12 passes up the gaps between the tubular portion 50 and the filter media sleeve 94. The air then passes through the sleeve of filter media 94 and through the perforations 92 before passing into the second insert 28 and out of the outlet 20.

The location of the filter within the vortex finder means that the vast majority of the condensate water and particulate material has already been removed from the compressed air stream. As a result, a simple filtration material, such as that described above, with a high percentage of voids is able to provide particulate filtration down to small particle size since it does not have to also deal with water condensate and the majority of particles have already been removed. At the same time, this filter element 80 is a small low-cost item that is easily added to the first insert 12 and the combined cost of both components is so low that they can be treated as disposable items and simply replaced as part of maintenance/servicing process.

Figure 9:
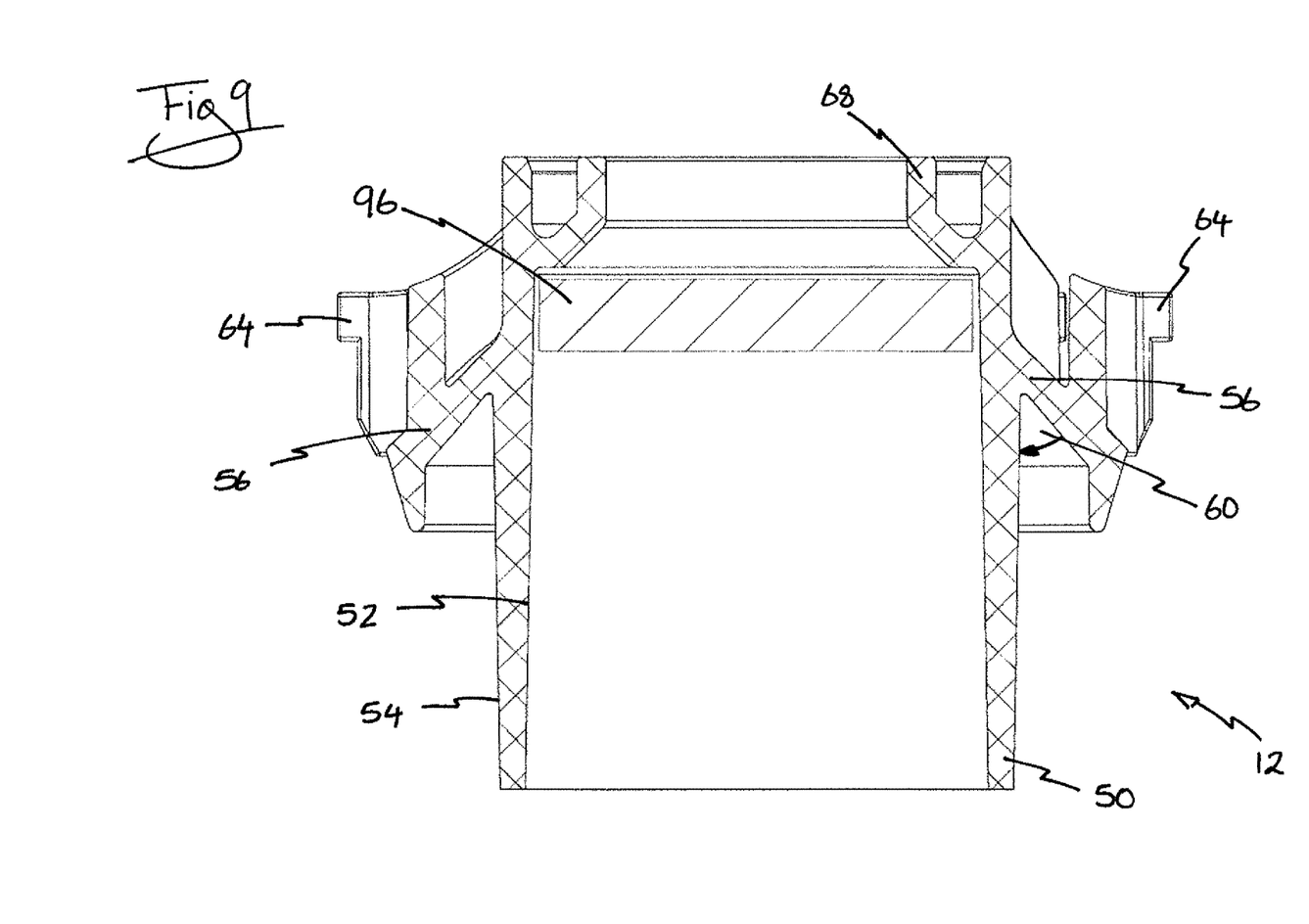
FIG. 9 is a sectional view of an alternative insert of the present invention.

In the embodiment shown in FIG. 9 the filter element 80 has been replaced with a filter screen 96.

It will be appreciated by person skilled in the art that the above embodiments have been described by way of example only and not in any limitative sense, and that various alterations and modifications are possible without departure from the scope of the protection which is defined by the appended claims. For example, the head portion 14 could be formed as a single component by casting.

The invention claimed is:

1. An apparatus for contaminant reduction in a stream of compressed gas, the apparatus comprising:
    a first insert for directing a stream of compressed gas;
    a head portion including an inlet for receiving a stream of compressed gas, an outlet for said gas, an inlet pathway for directing said gas from said inlet towards said first insert and an outlet pathway for directing said gas from said first insert towards said outlet;
    a body portion for collecting contaminants removed from said gas and connected to and sealed relative to said head portion, said body portion including a drain port for exhausting said contaminants after removal from said stream of compressed gas;
    wherein said first insert is located within a volume formed by said head and body portions and comprises
    a tubular portion connected to said head portion such that said gas from said inlet pathway engages said first insert externally of said tubular portion and said gas passes to said outlet pathway from internally of said tubular portion;
    at least one baffle extending from said tubular portion and thereby narrowing a substantially annular gap between said first insert and a wall of at least one of said body and head portions;
    at least one curved wall extending from said baffle for causing said stream of compressed gas to rotate around an axis of said tubular portion and thereby form a vortex; and
    wherein said at least one curved wall comprises a plurality of curved walls, said walls extending radially outwards beyond said baffle and forming retaining portions at distal ends of said walls for engaging at least one of said body and head portions; wherein the tubular portion extends below the baffle.

2. An apparatus according to claim 1, wherein said first insert comprises at least one injection moulded thermoplastic material.

3. An apparatus according to claim 1, wherein said head portion comprises a housing and a second insert thereby forming said inlet and outlet pathways.

4. An apparatus according to claim 1, wherein said housing comprises an extruded metallic material.

5. An apparatus according to claim 1, wherein said second insert comprises an injection moulded thermoplastic material.

6. An apparatus according to claim 1, further comprising a filter element located at least partially within said first insert.

* * * * *